United States Patent [19]
Polansky

[11] 3,760,155
[45] Sept. 18, 1973

[54] HEATING CABINET FOR TREATING NUT MEATS

[75] Inventor: Maurice I. Polansky, Montreal, Quebec, Canada

[73] Assignee: Quebec Vending Machine Co., Inc., Montreal, Quebec, Canada

[22] Filed: Aug. 28, 1972

[21] Appl. No.: 284,397

[30] Foreign Application Priority Data
Sept. 13, 1971 Canada .............................. 122721

[52] U.S. Cl. ..................... 219/399, 99/401, 99/447, 219/386, 219/392, 219/412, 219/428, 219/430, 219/521, 219/530
[51] Int. Cl. ....................... F27d 11/02, A21b 1/00
[58] Field of Search .................. 219/209, 385, 386, 219/387, 392, 399, 400, 402, 406, 428, 430, 439, 521, 530, 540; 165/2; 126/246; 312/236; 99/401, 447

[56] References Cited
UNITED STATES PATENTS

| | | | |
|---|---|---|---|
| 2,526,476 | 10/1950 | Ham | 219/392 |
| 2,678,990 | 5/1954 | Quirk | 219/406 |
| 3,168,642 | 2/1965 | Savio | 219/400 |
| 3,205,033 | 9/1965 | Stentz | 219/386 X |
| 3,340,380 | 9/1967 | Molitor | 219/386 |
| 3,387,114 | 6/1968 | Brake, Jr. et al. | 219/386 |
| 3,608,627 | 9/1971 | Shelvin | 165/2 |
| 1,037,771 | 9/1912 | Hughes | 219/386 |
| 3,126,882 | 3/1964 | Hilfiker | 219/385 X |
| 3,412,234 | 11/1968 | Otavka | 219/406 |
| 3,662,150 | 5/1972 | Hartung | 219/209 |

Primary Examiner—Volodymyr Y. Mayewsky
Attorney—Alan Swabey et al.

[57] ABSTRACT

A nut meat cabinet constructed of heat-conductive material. Shelving is provided on the walls of the cabinet for receiving trays of individual sealed packets of nut meats, wherein a portion of the packet is of conductive material and a heating element is fixed to one of the walls of the cabinet so as to heat the enclosed chamber formed by the cabinet by conductive heat.

1 Claim, 6 Drawing Figures

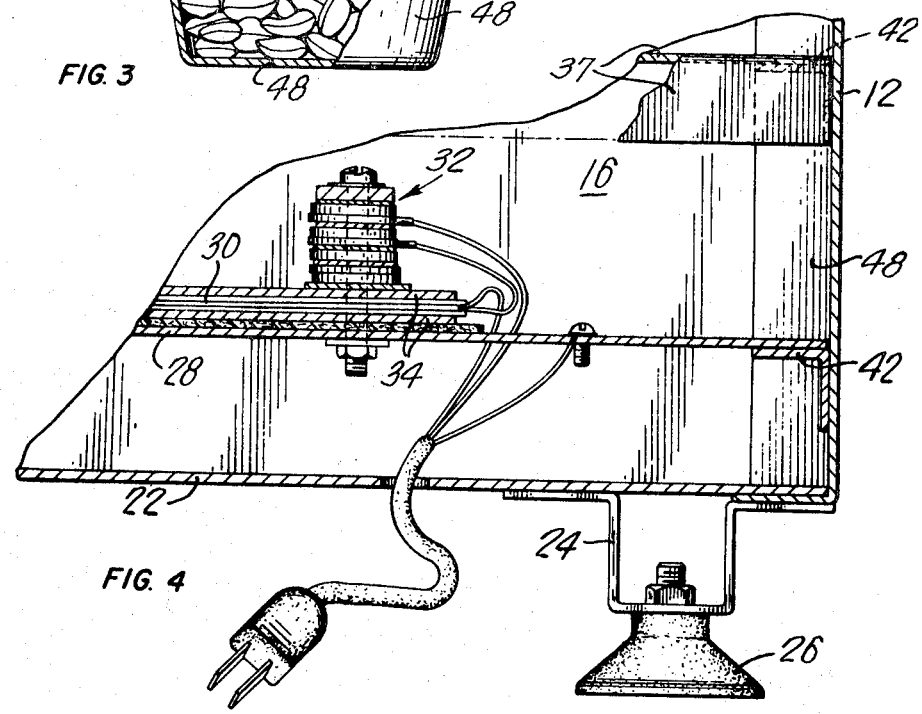
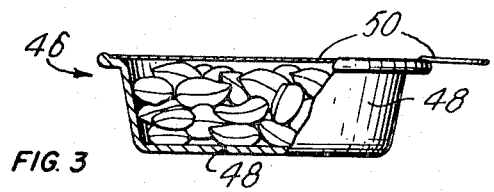
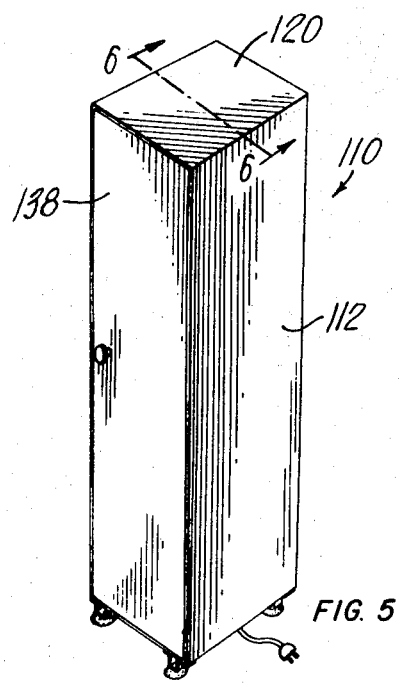
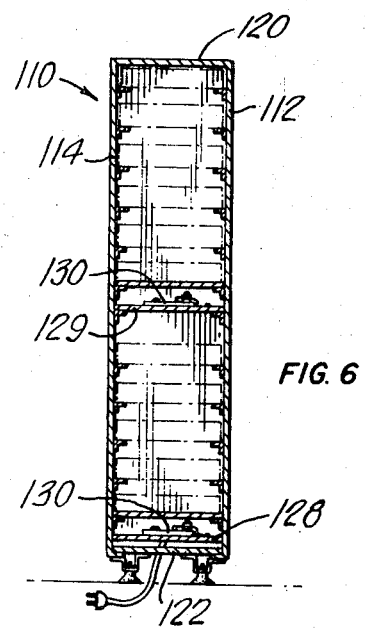

HEATING CABINET FOR TREATING NUT MEATS

BACKGROUND OF INVENTION

1. Field of Invention

The present invention relates to an apparatus for treating nut meats and the like, and more particularly to an apparatus for use in treating previously toasted nut meats while on sale.

2. Description of Prior Art

Heretofore, cabinets for storing nut meats while on display or sale have been provided, such as shown in U.S. Pat. No. 2,031,908, Sawin, 1936. In such cabinets, an open tray with the nut meats was supported on a single shelf of the cabinet and then was heated by radiant heat elements spaced above the open tray. The disadvantage of such a display cabinet is that shelving cannot be provided for storing a plurality of trays, since, with using a radiant heat element, as in the above-mentioned patent, the nut meats on shelves closest to the element would be at a much higher temperature than those spaced away from the element and particularly trays which would be on shelves not directly in line with the element.

Food warming cabinets have been developed whereby a plurality of shelves are provided onto which trays of hot nut meats could conceivably be stored. However, all of these cabinets depend on convection-type heating wherein blower devices are provided for circulating the air. The disadvantages with these systems are that the trays of nut meats would necessarily be open, thereby making it impractical for dispensing small amounts of the nut meats in individual trays or the like, as well as the disadvantages which are obvious from a sanitary point of view.

SUMMARY OF INVENTION

It is an aim of the present invention to provide a nut meat cabinet for maintaining the nut meats warm while they are on sale in a cabinet which is inexpensive to manufacture and in which relatively large quantities of nut meats can be stored and whereby the heat distribution within the cabinet will be evenly distributed.

A construction in accordance with the present invention includes a cabinet housing having at least a pair of spaced-apart parallel walls and an access door for access to the enclosure formed by the housing, shelf seats on the parallel walls, adapted to receive shelves and nut meat containers which are adapted to be received in the shelves on the shelf seats, characterized by the fact that at least the inner parallel walls of the cabinet and the shelf seats, as well as the nut meat containers are made of heat-conductive material and a thermostatic heating element being fixed to a heat-conductive wall of the cabinet.

BRIEF DESCRIPTION OF THE DRAWINGS

Having thus generally described the nature of the invention, reference will now be made to the accompanying drawings, showing by way of illustration, a preferred embodiment thereof, and in which:

FIG. 3 is an enlarged elevational view of a nut meat container partly in cross section;

FIG. 4 is an enlarged fragmentary cross-sectional view of a detail of the apparatus;

FIG. 5 is a perspective view of another embodiment of the present invention; and FIG. 6 is a vertical cross section taken along lines 6—6 of FIG. 5.

DESCRIPTION OF PREFERRED EMBODIMENTS

Figure 1:
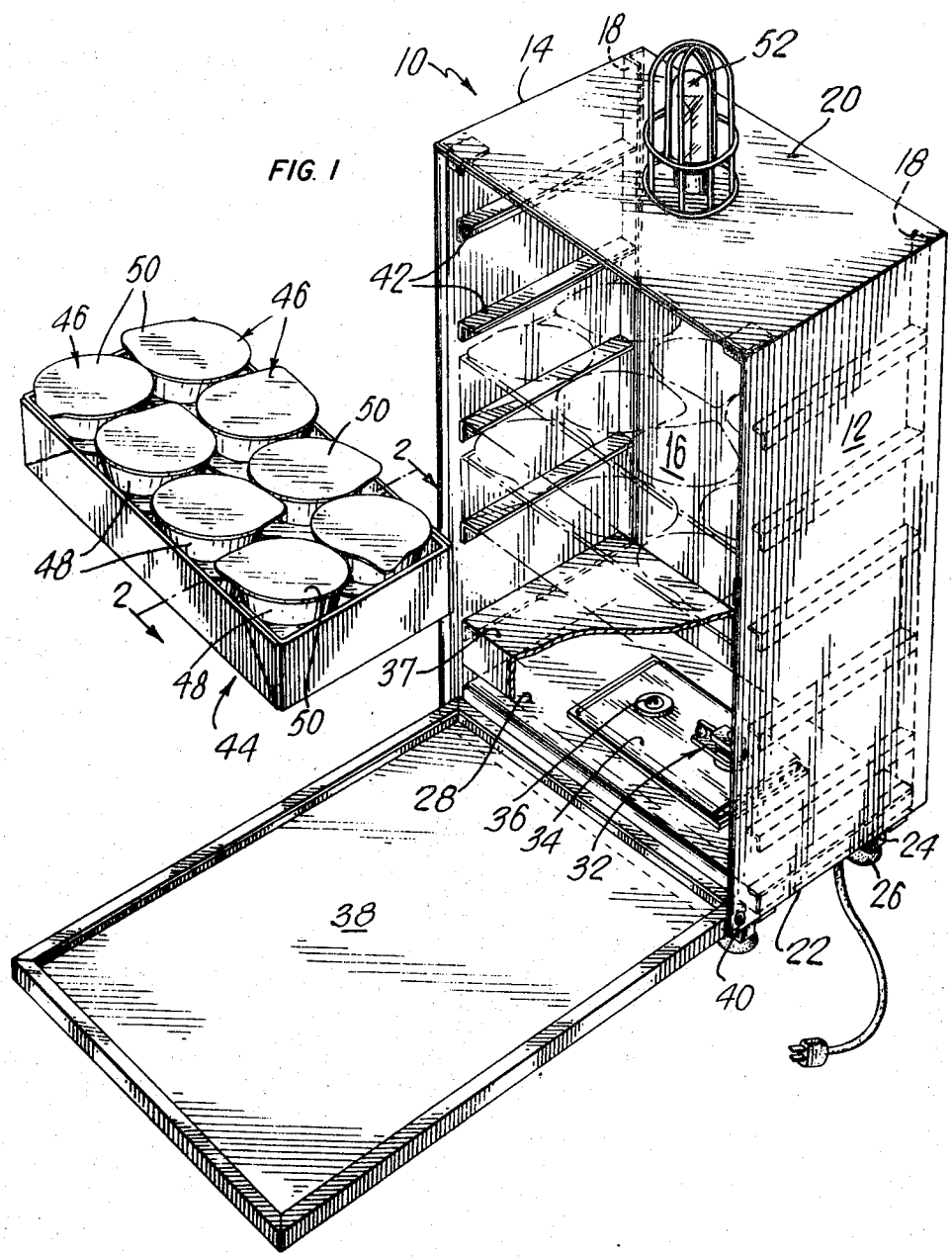
FIG. 1 is a perspective view of one embodiment of the present invention.

Referring back to the drawings, and particularly to FIG. 1, there is shown a cabinet 10 of sheet metal construction which has spaced-apart parallel side walls 12 and 14 and a rear wall 16. Fixed to these walls on corner frame members 18 is a top wall 20. The walls are all fixed to edges of a bottom wall 22 to which are fixed support legs 24 with flection cup devices 26 as shown in FIG. 4. Spaced from the bottom wall 22 is a false floor 28 to which is fixed a flat heating element 30, connected to a thermostatic device 32. The heating element is sandwiched between insulation members 34 in order to prevent someone from burning himself on the heating element as he reaches into the cabnet. A cover plate 37 can also be provided to prevent the radiant heat energy emitted from element 30 over-heating the first tray. However, if it is required to quickly heat the nut meats, for instance when a new supply of nut meats is added to the oven it will be preferable to remove the cover 37 and allow the oven to be heated by radiant heat from the element 30. The heating assembly is fixed to the false floor 28 by means of machine screws 36.

The front of the cabinet 10 is open; however, the cabinet can be closed by means of a door panel 38 pivoted about the axis 40 to the bottom corners of walls 12 and 14.

Figure 2:
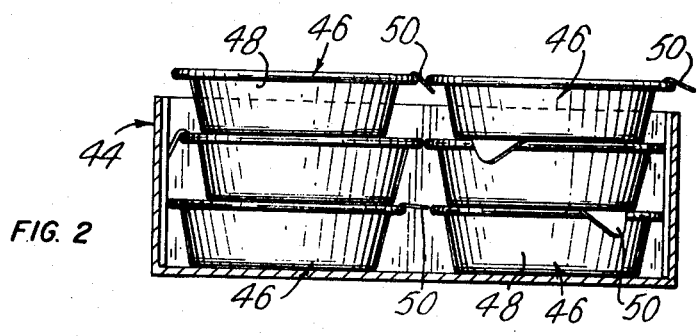
FIG. 2 is a vertical cross section taken along lines 2—2 of FIG. 1.

In the cabinet proper, there are provided angle members 42 which are spaced apart on the walls 12 and 14 opposite each other and form shelving seats for recieving permanent dispensing or properly sized cardboard trays 44 supplied by the dispensng agency. The nut meats as shown in FIG. 2 and 3 are contained in small individual consumption packets 46 which include an aluminum tray portion 48 and a paper lid 50 sealed to the tray 48. A number of these packets 46 can be supplied directly from the dispensing agency in the cardboard trays 44 and these trays 44 are simply placed in the cabinet on the shelf seats formed by the angle members 42. In the embodiment shown in FIGS. 5 and 6, the cabinet 110 is of similar construction to cabinet 10; however, the front access door 138 is hinged along the side wall 112. Furthermore, there are two false floors 128 and 129, each supporting heating element 130 for heating upper and lower sections of the cabinet 110.

In operation, the thermostatic control 32 is set at a suitable temperature, keeping the nut meats hot, but not in a cooking condition, and the trays 44, stacked with the containers 46, are placed in the cabinet 10 and the access door 38 is closed. The heat will conduct through the walls 28, 12 and 14 of the cabinet to heat the space around the containers 46, while the containers 46 themselves which are made of highly conductive material, as previously mentioned conduct the heat to the nut meats in an evenly distributed fashion. The heat conducted through the walls keeps the space around the containers evenly heated.

When it is required to sell the nut meats, the access door 38 is opened and an individual packet 46 is removed from one of the trays 44 and then the cabinet access door 38 is reclosed.

In order to more clearly identify the product, a red flashing light is provided on the top of the box 10 as shown at 52 in FIG. 1. A wire screen can be provided as a protective cage about the light. The light bulb is connected electrically to the circuit by conventional means, not shown.

I claim:

1. An apparatus for treating nut meats and the like by low temperature heat comprising, a cabinet housing defining a walled enclosure of heat conductive material including a top wall, a bottom wall, a rear wall, a pair of spaced-apart parallel upright walls and a door closing the front excess to the cabinet housing, shelves mounted on the spaced-apart paralled walls, an electrical heating element fixed to the bottom wall of the cabinet housing and dielectrically insulated therefrom, a thermostatic device electrically connected to said heating element for controlling temperature of the space within the cabinet housing, a plurality of individual containers of heat conductive material for containing said nut meats, trays for supporting the containers on said shelves, the space within the cabinet housing is evenly heated by the heat produced by the heating element and conducted through the heat conductive walls, and a cover plate spaced from and covering the heating element to prevent the nut meats in the containers nearest the heating element to be overheated, said cover plate being removable to allow the nut meats in the containers to be rapidly heated by radiant heat from the heating element when the containers are first placed in the cabinet housing.

* * * * *